UNITED STATES PATENT OFFICE.

OTTOKAR SERPEK, OF PARIS, FRANCE, ASSIGNOR TO SOCIÉTÉ GÉNÉRALE DES NITRURES, OF PARIS, FRANCE.

PROCESS FOR THE MANUFACTURE OF ALUMINIUM NITRID.

1,094,171.  Specification of Letters Patent. Patented Apr. 21, 1914.

No Drawing.  Application filed May 7, 1912. Serial No. 695,722.

*To all whom it may concern:*

Be it known that I, OTTOKAR SERPEK, a subject of the Emperor of Austria-Hungary, and a resident of 12 Rue Roquepine, Paris, France, have invented a new and useful Process for the Manufacture of Aluminium Nitrid, of which the following is a specification.

It is known that the formation of aluminium nitrid by the action of a current of nitrogen upon a mixture of carbon and alumina at high temperature is facilitated when there are added to the bodies present certain metallic oxids or hydroxids. It is further known that this reaction is also facilitated when there is added to the nitrogen serving for the reaction a certain quantity of hydrogen in the free state. This hydrogen may be nominally free or may be obtained by the employment of substances, such as carbids or sulfids of hydrogen, capable of setting the hydrogen free under the conditions of operation. This being so, the present invention is based upon the following fact; it has been found that the simultaneous addition of hydrogen to the reacting nitrogen and of oxid, hydroxids, metallic carbonates and even metals to the solid mixture of alumina and carbon, increases the fixation of nitrogen to an extent much greater than was to be anticipated. The effect obtained owing to these combined additions is considerably greater than the sum of the results obtained by each of the separate additions.

The following examples will demonstrate the fact:

Example I: A mixture of 10 parts of alumina and 2.5 parts of carbon was heated in a furnace for one hour at 1500° C., (*a*) in a current of gas containing 9 parts of nitrogen and 1 of hydrogen, (*b*) in a current of nitrogen alone but with addition of 1.5 parts of iron oxid to the mixture, (*c*) in a current of gas containing 9 parts of nitrogen and 1 part of hydrogen, and with addition of 1.5 parts of iron oxid to the mixture. In these three cases the following quantities of nitrogen were fixed: (*a*) 12.85% (*b*) 7.7% (*c*) 27.07%. In this reaction the added oxid is reduced to metal, which becomes the catalytic agent.

Example II: There was heated for one hour in a furnace at 1525° C. (*a*) a mixture containing 10 parts of alumina and 2.5 parts of carbon, in a current of gas containing 9 parts of nitrogen and 1 part of hydrogen, (*b*) a mixture containing 10 parts of alumina, 5 parts of carbon and 1.5 parts of manganese carbonate in a current of nitrogen alone, (*c*) a mixture containing 10 parts of alumina, 5 parts of carbon and 1.5 parts of manganese carbonate in a current of gas containing 9 parts of nitrogen and 1 part of hydrogen.

The following quantities of nitrogen were fixed: (*a*) 15.27% (*b*) 6.1% (*c*) 24%.

I claim—

1. The process for the manufacture of aluminium nitrid, consisting in heating at temperatures above approximately 1300 degrees C. a mixture of aluminous material and carbon with a catalytic substance, in a current of nitrogen with a proportion of free hydrogen.

2. The process for the manufacture of aluminium nitrid, consisting in heating at temperatures above approximately 1300 degrees C. in a current of nitrogen with a proportion of free hydrogen a mixture of aluminous material and carbon with a catalytic substance producing a metal in the reaction.

In testimony whereof, I have signed my name to this specification, in the presence of two subscribing witnesses.

OTTOKAR SERPEK.

Witnesses:
 H. C. COXE,
 LÉON PEILLET.